(12) United States Patent
Chakravarthy et al.

(10) Patent No.: US 9,172,510 B2
(45) Date of Patent: Oct. 27, 2015

(54) SYSTEMS AND METHODS FOR IMPROVED RECOVERY FOR THE DOWNLINK

(75) Inventors: Chetan G. Chakravarthy, San Diego, CA (US); Preyas D. Desai, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 580 days.

(21) Appl. No.: 13/332,818

(22) Filed: Dec. 21, 2011

(65) Prior Publication Data

US 2013/0163510 A1    Jun. 27, 2013

(51) Int. Cl.
*H04W 80/04*    (2009.01)
*H04W 84/12*    (2009.01)
*H04W 88/06*    (2009.01)
*H04L 1/16*     (2006.01)

(52) U.S. Cl.
CPC ............ *H04L 1/1628* (2013.01); *H04L 1/1685* (2013.01)

(58) Field of Classification Search
CPC ..... H04W 80/04; H04W 84/12; H04W 88/06; H04W 88/08; H04W 84/18; H04W 84/78
See application file for complete search history.

(56) References Cited

U.S. PATENT DOCUMENTS

| | | | | |
|---|---|---|---|---|
| 5,461,627 | A * | 10/1995 | Rypinski | 370/346 |
| 6,947,451 | B1 * | 9/2005 | Dommety et al. | 370/328 |
| 7,720,079 | B2 | 5/2010 | Robinson et al. | |
| 8,514,120 | B2 * | 8/2013 | Oberhuber et al. | 341/144 |
| 8,582,135 | B2 * | 11/2013 | Iwadate | 358/1.14 |
| 2003/0093461 | A1 * | 5/2003 | Suzuki et al. | 709/202 |
| 2004/0147236 | A1 * | 7/2004 | Parkvall et al. | 455/132 |
| 2006/0013257 | A1 * | 1/2006 | Vayanos | 370/473 |
| 2007/0008990 | A1 * | 1/2007 | Torsner | 370/473 |
| 2007/0121529 | A1 * | 5/2007 | Meier | 370/256 |
| 2007/0259699 | A1 * | 11/2007 | Homchaudhuri | 455/574 |
| 2008/0101411 | A1 * | 5/2008 | Takahashi et al. | 370/473 |
| 2008/0225824 | A1 * | 9/2008 | Meylan et al. | 370/346 |
| 2009/0028126 | A1 * | 1/2009 | Meylan | 370/346 |

(Continued)

FOREIGN PATENT DOCUMENTS

| | | |
|---|---|---|
| GB | 2396088 | 6/2005 |
| WO | 2009076124 A1 | 6/2009 |

OTHER PUBLICATIONS

3GGP TS 25.322 V7. 10.0., Technical Specification Group Radio Access Network, Radio Link Control (RLC) protocol specification (Release 7).

(Continued)

*Primary Examiner* — Michael J Moore, Jr.
*Assistant Examiner* — Prenell Jones
(74) *Attorney, Agent, or Firm* — Kevin T. Cheatham

(57) ABSTRACT

Systems, methods, and devices for an improved recovery for the downlink are described herein. In some aspects, delay and overhead associated with retransmission of data lost due to an interruption can be reduced and/or eliminated by configuring a receiver to generate and transmit status information following resumption from the interruption. The receiver can be configured to generate and transmit status information immediately upon resuming from the interruption. In some aspects, the receiver can be configured to automatically generate and transmit status information independent of receiving a polling request from the sender. Status information can indentify at least last received user data prior to the interruption. In some aspects, status information further identifies lost data due to the interruption.

49 Claims, 10 Drawing Sheets

(56) References Cited

U.S. PATENT DOCUMENTS

| | | |
|---|---|---|
| 2009/0190156 A1* | 7/2009 | Iwadate ........................ 358/1.14 |
| 2010/0105334 A1* | 4/2010 | Terry et al. ................. 455/67.11 |
| 2010/0202398 A1 | 8/2010 | Terry et al. |
| 2010/0278051 A1* | 11/2010 | Larmo et al. .................. 370/242 |
| 2011/0013567 A1 | 1/2011 | Torsner et al. |
| 2011/0041024 A1 | 2/2011 | Burbidge et al. |
| 2011/0116633 A1* | 5/2011 | Funnell et al. ................ 380/270 |
| 2011/0188464 A1 | 8/2011 | Shinohara et al. |
| 2011/0194502 A1 | 8/2011 | Sung et al. |
| 2011/0222493 A1* | 9/2011 | Mangold et al. .............. 370/329 |
| 2012/0197528 A1* | 8/2012 | Le et al. ............................ 702/7 |

OTHER PUBLICATIONS

Balachandran K., et al., "Efficient transmission of ARQ feedback for EGPRS radio link control" Vehicular Technology Conference, 1999. VTC 1999—Fall. IEEE VTS 50TH Amsterdam, Netherlands Sep. 19-22, 1999, Piscataway, NJ, USA,IEEE, US, vol. 3, Sep. 19, 1999, pp. 1663-1669, XP010353299.

International Search Report and Written Opinion—PCT/US2012/071059—ISA/EPO—May 7, 2013.

* cited by examiner

SYSTEMS AND METHODS FOR IMPROVED RECOVERY FOR THE DOWNLINK

BACKGROUND

1. Field

The present application relates generally to wireless communications, and more specifically to systems, methods, and devices for an improved recovery for the downlink.

2. Background

Wireless communication systems are widely deployed to provide various types of communication content such as voice and data. Typical wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded high voice quality, reliable service, and low prices.

To accommodate increasing demand, evolution of core networks of wireless communication systems followed from evolution of radio interfaces. For example, System Architecture Evolution (SAE) lead by 3GPP aims to evolve a Global System for Mobile communications (GSM)/General Packet Radio Service (GPRS) core network. The resultant Evolved Packet Core (EPC) is a multi-access core network based on the Internet Protocol (IP) that enables operators to deploy and utilize one common packet-based core network with a plurality of radio access technologies. The EPC provides optimized mobility for mobile devices and enables efficient handovers between different radio access technologies (e.g., between LTE and High Rate Packet Data (HRPD)). In addition, standardized roaming interfaces enable operators to offer services to subscribers across a variety of access technologies.

The devices in a wireless communication system may transmit/receive information between each other. As part of the communication process, a first device that receives information from a second device may transmit a positive acknowledgment (ACK) to the second device acknowledging that the first device received the information. Further, the first device may transmit a negative acknowledgment (NACK) to the second device indicating that the first device has not received the information. The act of transmitting a positive acknowledgment and/or negative acknowledgment informs the first device whether the transmitted information was received successfully by the second device or whether information needs to be retransmitted.

In certain situations, the first device may not have received information transmitted by the second device due to an interruption. In such situations, the first device may employ one or more recovery mechanisms to indicate to the second device that information needs to be retransmitted. However, the delay and overhead associated with utilizing such recovery mechanisms may be especially problematic in some wireless systems. For example, when the second device transmits a continuous steam of information to the first device, such as during a voice and/or video call, the delay and overhead associated with recovering lost information can cause severe degradation of call data rates. Thus, improved systems, methods, and devices for recovering from interruptions in data transmission and reception are desired.

SUMMARY

Various implementations of systems, methods and devices within the scope of the appended claims each have several aspects, no single one of which is solely responsible for the desirable attributes described herein. Without limiting the scope of the appended claims, some prominent features are described herein. Other features, aspects, and advantages will become apparent from the description, the drawings, and the claims.

One aspect of the disclosure provides an apparatus for communicating in a wireless network. The apparatus includes a processor configured to receive user data from a sender and stop receiving user data from the sender due to an interruption. The processor is configured, upon resuming from the interruption, to transmit status information to the sender identifying at least last received user data prior to the interruption. In some aspects, status information further includes identification of lost data due to the interruption.

Another aspect of the disclosure provides a method of communicating in a wireless network. The method includes receiving user data from a sender and suspending receiving user data from the sender due to an interruption. The method includes, upon resuming from the interruption, transmitting status information to the sender identifying at least last received user data prior to the interruption. In some aspects, status information further includes identification of lost data due to the interruption.

Another aspect of the disclosure provides a computer readable medium. The computer readable medium includes instructions that when executed cause an apparatus to wirelessly receive user data from a sender and stop receiving user data from the sender due to an interruption. The computer readable medium includes instructions that when executed cause the apparatus, upon resuming from the interruption, to wirelessly transmit status information to the sender identifying at least last received user data prior to the interruption. In some aspects, status information further includes identification of lost user data due to the interruption.

Another aspect of the disclosure provides an apparatus for communicating in a wireless network. The apparatus includes means for receiving user data from a sender and means for determining whether the receiving means has ceased receiving user data from the sender due to an interruption. The apparatus includes means for transmitting upon resuming from the interruption status information to the sender identifying at least last received user data prior to the interruption. In some aspects, status information further includes identification of lost user data due to the interruption.

Figure 1:
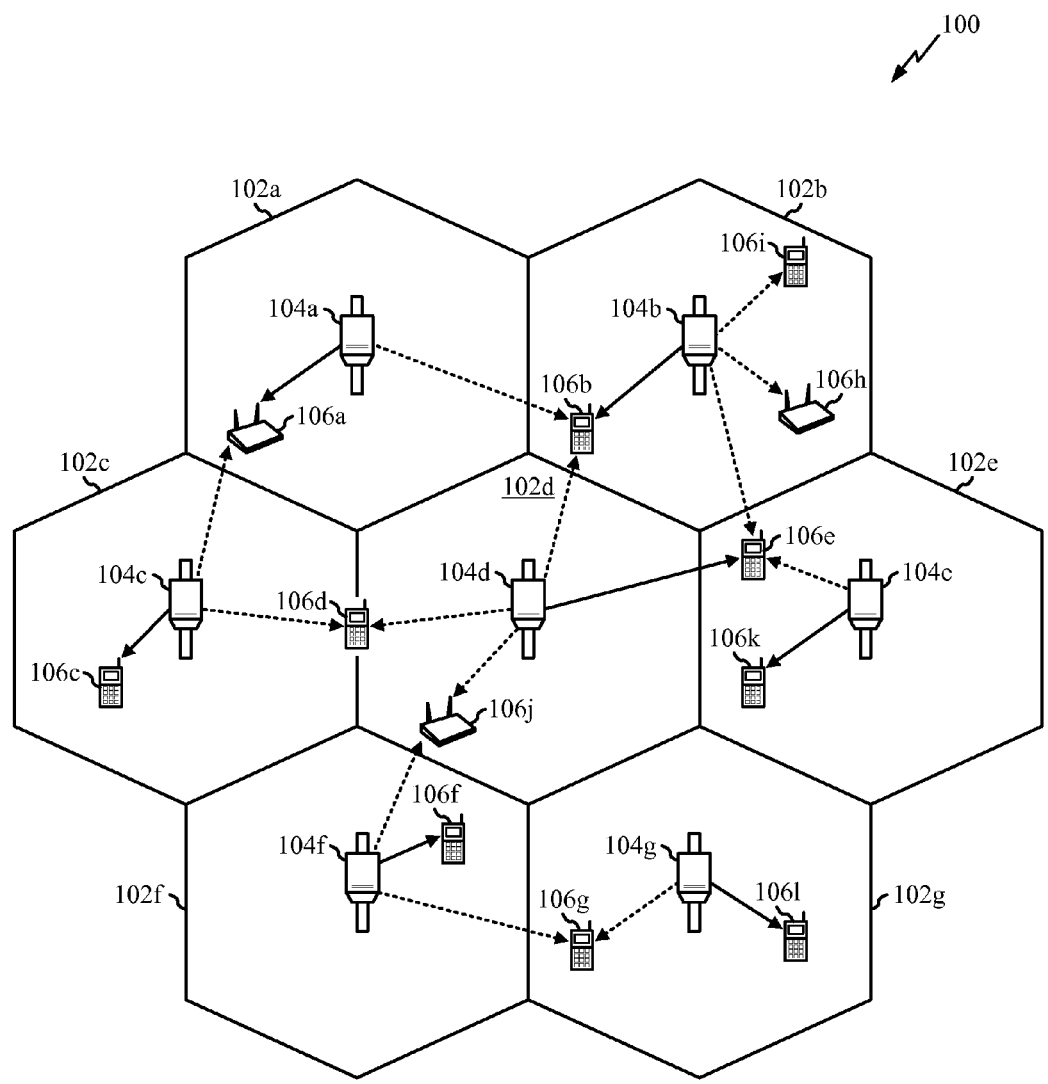
FIG. 1 illustrates an example of a wireless communication network in which aspects of the present disclosure may be employed.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary" is not necessarily to be construed as preferred or advantageous over other implementations. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the implementations shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Furthermore, in the following description, for reasons of conciseness and clarity, terminology associated with the UMTS systems is used. It should be emphasized that the invention may also be applicable to other technologies, such as technologies and the associated standards related to LTE Advanced, LTE, W-CDMA, TDMA, OFDMA, High Rate Packet Data (HRPD), Evolved High Rate Packet Data (eHRPD), Worldwide Interoperability for Microwave Access (WiMax), GSM, enhanced data rate for GSM evolution (EDGE), and so forth. Terminologies associated with different technologies can vary. For example, depending on the technology considered, the User Equipment (UE) used in UMTS can sometimes be called a mobile station, a user terminal, a subscriber unit, an access terminal, etc., to name just a few. Likewise, Node B used in UMTS can sometimes be called an evolved Node B (eNodeB), an access node, an access point, a base station (BS), HRPD base station (BTS), and so forth. It should be noted here that different terminologies apply to different technologies when applicable.

FIG. 1 illustrates an example of a wireless communication network or system 100 in which aspects of the present disclosure may be employed. The wireless communication network 100 may operate pursuant to a wireless standard, for example the LTE Advanced standard, LTE standard, WiMax standard, GSM standard, EDGE standard, 802.11ah standard, WiFi Advanced-N standard, and so forth. The wireless communication system 100 may include an access point (AP) 104, which communicates with stations (STAs) 106.

An access point ("AP") may comprise, be implemented as, or known as a Node B, Radio Network Controller ("RNC"), eNodeB, Base Station Controller (BSC), Base Transceiver Station (BTS), Base Station (BS), Transceiver Function (TF), Radio Router, Radio Transceiver, or some other terminology.

A station STA may comprise, be implemented as, or known as an access terminal (AT), a subscriber station, a subscriber unit, a mobile station, a remote station, a remote terminal, a user terminal, a user agent, a user device, user equipment (UE), or some other terminology. In some implementations an access terminal may comprise a cellular telephone, a cordless telephone, a Session Initiation Protocol (SIP) phone, a wireless local loop ("WLL") station, a personal digital assistant (PDA), a handheld device having wireless connection capability, or some other suitable processing device connected to a wireless modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a wireless sensor device, a global positioning system device, or any other suitable device that is configured to communicate via a wireless medium.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with W-CDMA or CDMA techniques. If this is the case, the wireless communication system 100 may be referred to as a W-CDMA or CDMA system.

A communication link that facilitates transmission from the AP 104 to one or more of the STAs 106 may be referred to as a downlink (DL), and a communication link that facilitates transmission from one or more of the STAs 106 to the AP 104 may be referred to as an uplink (UL). Alternatively, a downlink may be referred to as a forward link or a forward channel, and an uplink may be referred to as a reverse link or a reverse channel.

The AP 104 may act as a base station and provide wireless communication coverage in a basic service area (BSA) 102.

Depending on the technology considered, BSA can sometimes be called coverage area, cell, etc. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
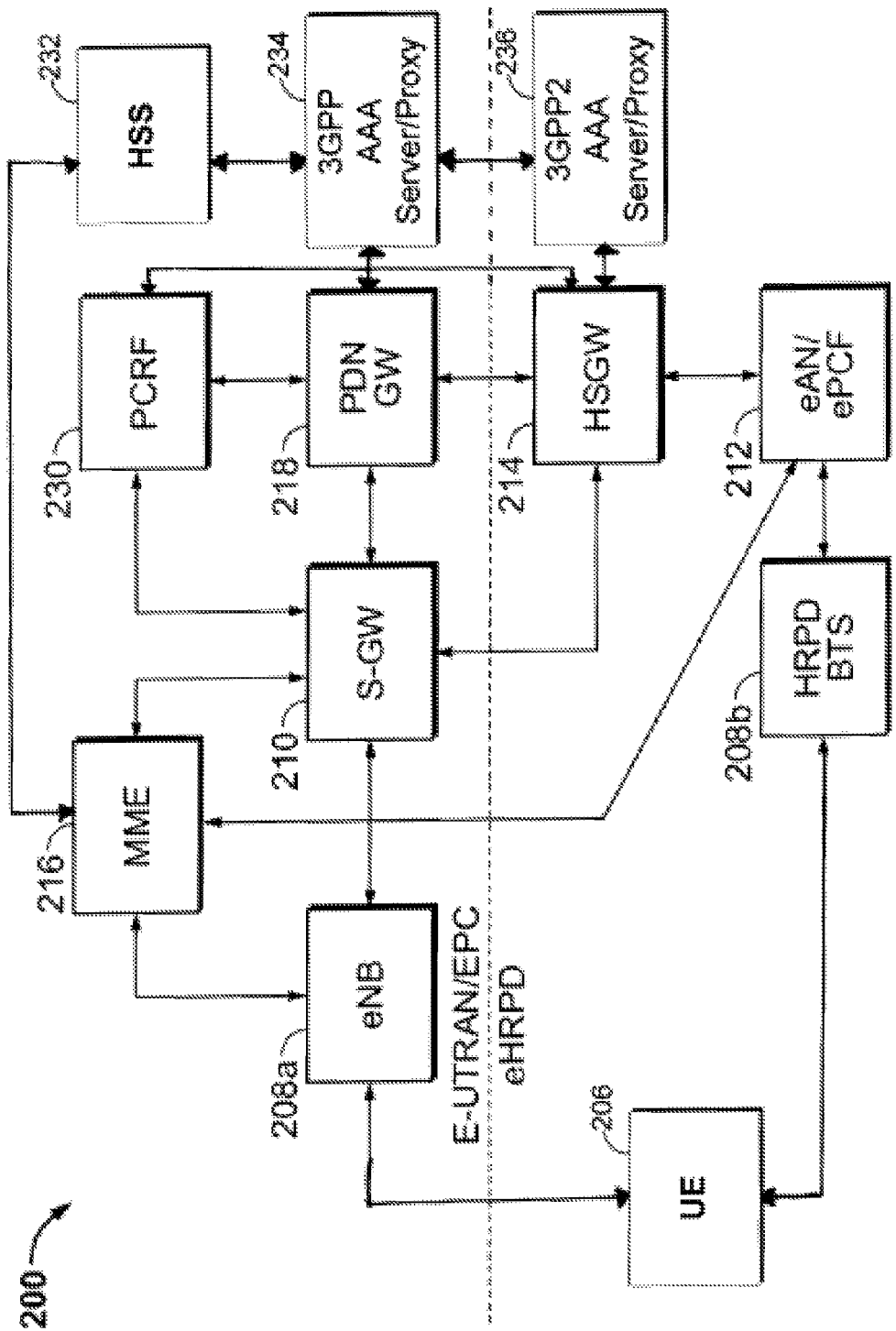
FIG. 2 illustrates an example of a functional block diagram of certain communication entities of the wireless communication network of FIG. 1.

FIG. 2 illustrates an example of a functional block diagram of a system 200 of certain communication entities of the wireless communication network of FIG. 1. The components shown in FIG. 2 illustrate a system in which a multimode or multiband device may communicate using multiple radio access technologies (RATs), for example an eHRPD network, an LTE network, etc. depending on the configuration of the network in the location in which the mobile device is currently operating. As FIG. 2 illustrates, the system 200 may include a radio access network RAN that provides wireless radio communications between a UE 206 and an eNodeB 208a (e.g., a Node B, base station, access point, etc.) using LTE radio access technology. The system also depicts a RAN which provides wireless radio communications between a UE 206 and a HRPD base transceiver station (BTS) 208b (e.g., a Node B, base station, access point etc.) using eHRPD radio access technology. For simplicity of discussion, FIG. 2 depicts a UE 206 and one eNodeB 208a in a RAN and one HRPD BTS 208b in another RAN; however, it is to be appreciated that each RAN may include any number of UEs and/or eNodeBs/HRPD BTSs. In addition, it is to be appreciated that additional RANs may be included, such as UTRA, GSM, EDGE, and so forth.

In accordance with one aspect, the eNodeB 208a and HRPD BTS 208b may transmit information to a UE 206 over a forward link or downlink channel and a UE 206 can transmit information to the eNodeB 208a and HRPD BTS 209b over a reverse link or uplink channel. As shown, RANs can utilize any suitable type of radio access technology such as, but not limited to, LTE, LTE Advanced, HSPA, CDMA, HRPD, eHRPD, CDMA2000, GSM, GPRS, EDGE, UMTS, or the like.

The RANs, and specifically the eNodeB 208a and HRPD BTS 208b, can communicate with a core network that enables charging (e.g., usage charges for services, etc.), security (e.g., ciphering and integrity protection), subscriber management, mobility management, bearer management, QoS handling, policy control of data flows, and/or interconnections with external networks. The RANs and core network can communicate via an S1 interface, for instance. The core network can include a mobility management entity (MME) 216 that can be an end-point for control signaling from the RAN. The MME 216 can provide functions such as mobility management (e.g., tracking), authentication, and security. The MME 216 can communicate with the RANs via the S1 interface. The core network can also include a serving gateway (S-GW) 210 which is a user plane node that connects the core network to the LTE RAN. The core network may also include a HRPD serving gateway (HSGW) 214 which connects the core network to the eHRPD RAN. The eHRDP RAN also includes an evolved access node (eAN) and an evolved packet control function (ePCF) entity 212 which manages the relay of packets between the HRPD BTS 208b and the HSGW 214.

In an aspect, the MME 216 can communicate with the S-GW 210 or the eAN/ePCF 212 via an S11 interface. Furthermore, the HSGW 214 and the S-GW 210 may communicate to facilitate interoperability between the eHRPD network and the EPC. In another aspect, the MME 216 and S-GW 210 can be configured as a single node to provide a single end-point for user and control signaling originating from a RAN and/or terminating at a RAN. The network may also include a policy and charging rules function (PCRF) 230. The PCRF 230 may communicate with the S-GW 210, the HSGW 214, a PDN GW 218 and the core network.

The core network can also include a packet data network (PDN) gateway (GW) 218 that facilitates communications between the core network (and the RANs) and external networks. The PDN GW 218 can provide packet filtering, QoS policing, charging, IP address allocation, and routing of traffic to external networks. In an example, the S-GW 210 and the PDN GW 218 can communicate via an S5 interface. While illustrated as separate nodes in FIG. 2, it is to be appreciated that the S-GW 210 and PDN GW 218, for example, can be configured to operate as a single network node to reduce user plane nodes in core network. In one aspect, the core network may also include a 3GPP authentication, authorization and accounting (AAA) server/proxy 234 and a 3GPP2 AAA server/proxy 236 which many communicate with each other and further communicate with the PDN GW 218 and the HSGW 214 respectfully. The core network may also include a home subscriber services (HSS) entity 232 which may communicate with the MME 216 and the 3GPP AAA server/proxy 234.

The core network can communicate with external networks via the PDN GW 218. The external networks, not shown, can include networks such as, but not limited to, a public switched telephone network (PSTN), an IP multimedia subsystem (IMS), and/or an IP network. The IP network can be the Internet, a local area network, a wide area network, an intranet, or the like. It should be appreciated that configuration shown in FIG. 2 is an example of just one possible configuration and many other configurations and additional components may be used in accordance with various aspects and implementations described below.

Figure 3:
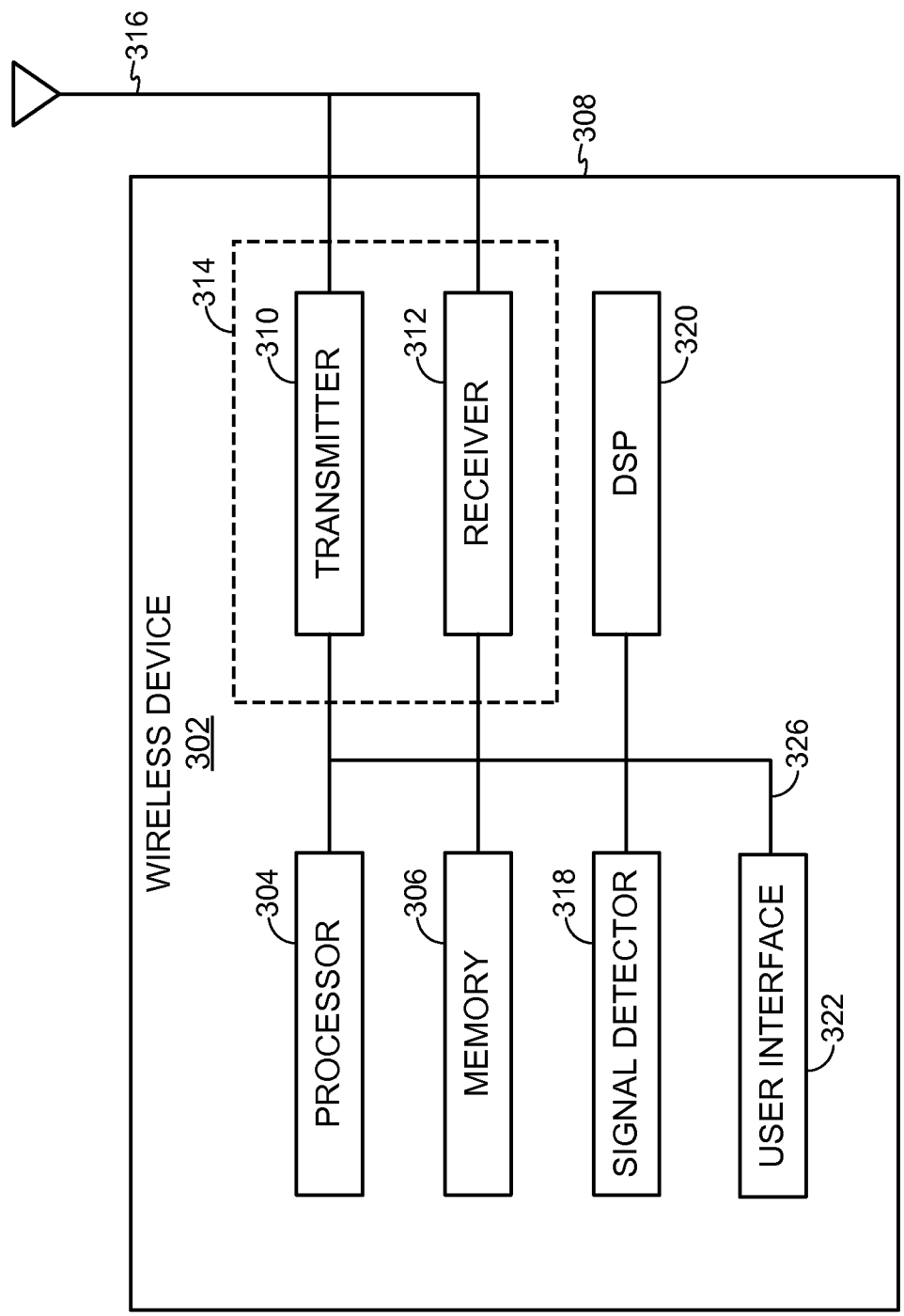
FIG. 3 illustrates an example of a functional block diagram of a wireless device that may be employed within the wireless communication network of FIG. 1.

FIG. 3 illustrates an example of a functional block diagram of a wireless device that may be employed within the wireless communication network of FIG. 1. The wireless device 302 is an example of a device that may be configured to implement the various methods described herein. For example, the wireless device 302 can comprise a STA, a UE, an AT, a subscriber station, a subscriber unit, a mobile station, a remote station, a remote terminal, a user terminal, a user agent, a user device, etc. As another example, the wireless device 302 may be multimode or multiband device, capable of operating using different radio access technologies (RATs), such as using LTE, LTE Advanced, HSPA, CDMA, HRPD, eHRPD, CDMA2000, GSM, GPRS, EDGE, UMTS, or the like.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The data in memory 306 may include configuration data. Configuration data may be preloaded into the memory 306. Configuration data may be obtained from a user of the wireless device 302 (e.g., through an interface 322, SIM card, download, over the air). The processor 304 may perform logical and arithmetic operations further based on the configuration data.

In some aspects, the processor 304 is configured to determine whether the wireless device 302 has received user data from a sender (e.g., AP 104, STA 106, etc.), for example using a receiver 312. User data can include traffic data, payload data, call data, video data, multimedia data, email data, and the like. In some aspects, the processor 304 is further configured to determine whether the wireless device 302 has stopped receiving user data from the sender due to an interruption, such as an interruption in a communication channel, monitoring of a channel other than a channel configured for receiving user data, etc. Upon resuming from the interruption, the processor 304 can be configured to generate status information identifying at least last received user data prior to the interruption. In some aspects, status information further identifies lost data due to the interruption. Generated status information can be transmitted to the sender by a transmitter 310.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that includes the transmitter 310 and/or the receiver 312 to allow transmission and reception of data between the wireless device 302 and a remote location. As alluded to above, the transmitter 310 may be configured to wirelessly transmit status information. Further, the receiver 312 may be configured to wirelessly receive user data. The transmitter 310 and receiver 312 may be combined into a transceiver 314. An antenna 316 may be attached to the housing 308 and electrically coupled to the transceiver 314. The wireless device 302 may also include (not shown) multiple transmitters, multiple receivers, multiple transceivers, and/or multiple antennas.

The wireless device 302 may also include a signal detector 318 that may be used in an effort to detect and quantify the level of signals received by the transceiver 314. The signal detector 318 may detect such signals as total energy, energy per subcarrier per symbol, power spectral density, and other signals. The wireless device 302 may also include a digital signal processor (DSP) 320 for use in processing signals. The DSP 320 may be configured to generate a packet for transmission and/or process a received packet.

In some aspects, the wireless device 302 may further comprise a user interface 322. The user interface 322 may comprise a keypad, a microphone, a speaker, and/or a display. The user interface 322 may include any element or component that conveys information to a user of the wireless device 302 and/or receives input from the user.

The various components of the wireless device 202 may be coupled together by a bus system 326. The bus system 326 may include a data bus, for example, as well as a power bus, a control signal bus, and a status signal bus in addition to the data bus. Those of skill in the art will appreciate the components of the wireless device 302 may be coupled together or accept or provide inputs to each other using some other mechanism.

Although a number of separate components are illustrated in FIG. 3, those of skill in the art will recognize that one or more of the components may be combined or commonly implemented. For example, the processor 304 may be used to implement not only the functionality described above with respect to the processor 304, but also to implement the functionality described above with respect to the signal detector 318 and/or the DSP 320. Further, each of the components illustrated in FIG. 3 may be implemented using a plurality of separate elements. For example, the processor 304 and the memory 306 may be embodied on a single chip. The processor 304 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks, and the like, such as shown and described in FIG. 3. One or more of the functional blocks and/or one or more combinations of the functional blocks described with respect to the wireless device 302 may also be implemented as a combination of computing devices, e.g., a combination of a DSP and a microprocessor, a plurality of microprocessors, one or more microprocessor in conjunction with a DSP communication, or any other such configuration.

Figure 4:
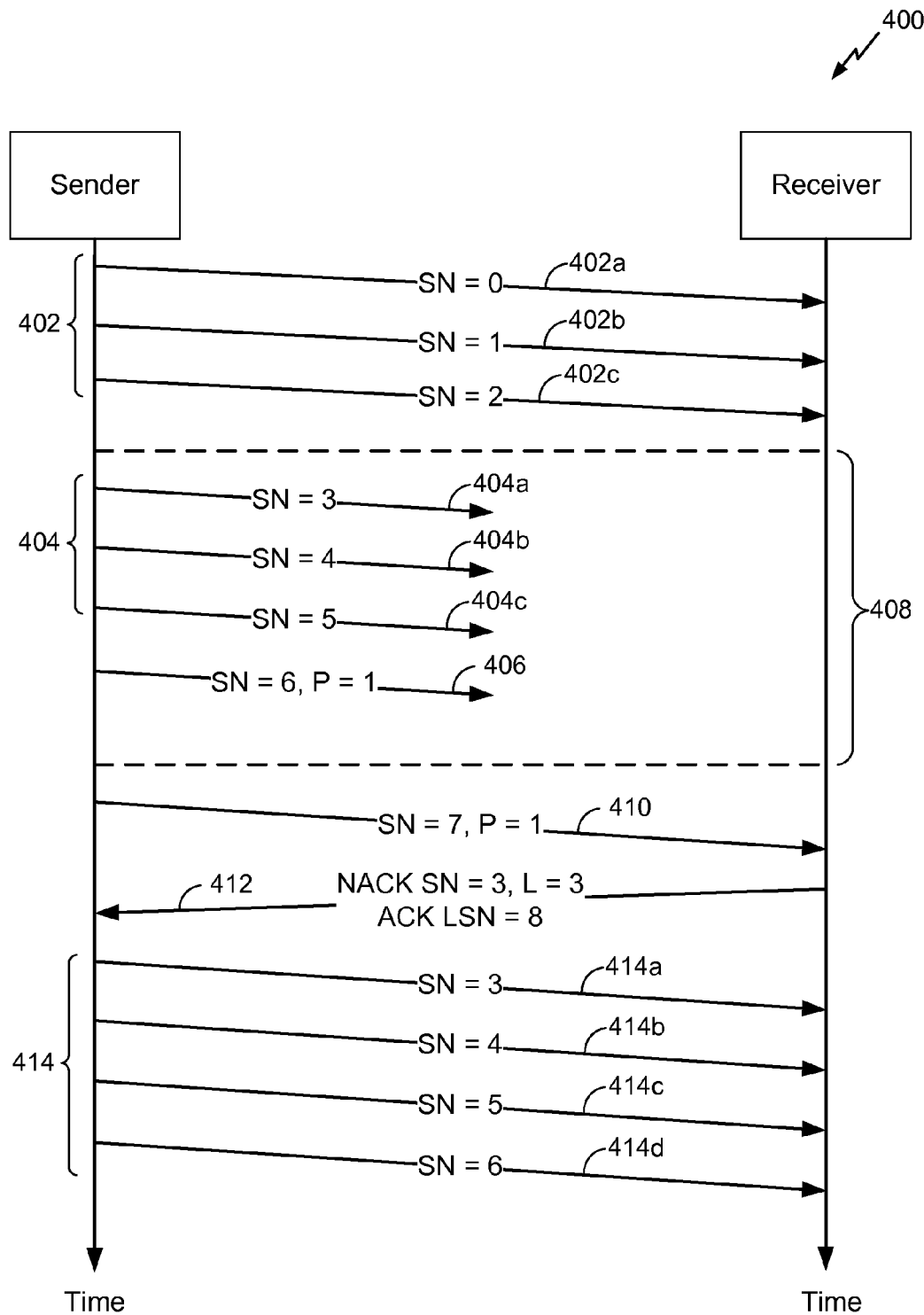
FIG. 4 illustrates an example of a recovery for the downlink that may be employed within the wireless communication network of FIG. 1.

FIG. 4 illustrates an example of a recovery for the downlink 400 that may be employed within the wireless communication network of FIG. 1. A sender entity depicted in FIG. 4 may be an AP, a Node B, a STA, a UE, etc. A receiver can include, for example, a wireless device 302. In one aspect, as is depicted in FIG. 4, the sender and receiver exchange messages, which are illustrated as being communicated in sequential or temporal order. The messages may comprise user data and/or status information. User data can include payload data, call data, video data, multimedia data, email data, and the like. In some aspects, status information includes a positive acknowledgment (ACK) or a plurality of positive acknowledgments (ACKs) indicating that the receiver has successfully received user data transmitted by the sender. In some aspects, status information also includes a negative acknowledgment (NACK) or a plurality of negative acknowledgments (NACKs) indicating that the receiver has not received user data transmitted by the sender. The act of transmitting an acknowledgment and/or negative acknowledgment may inform the sender whether user was received successfully or whether user data needs to be retransmitted.

In one aspect, user data is transmitted as a plurality of data packets, for example, data protocol data units (PDUs), as is further described in 3GPP TS 25.322: Radio Link Control (RLC) protocol specification (Release 7). Each data packet can include an identification number, such as a sequence number (SN), which can be unique. As is illustrated in FIG. 4, the sender transmits data PDUs 402 (e.g., 402a having SN=0, 402b having SN=1, and 402c having SN=2) to the receiver. This user data is received successfully. Next, the sender transmits data PDUs 404 (e.g., 404a having SN=3, 404b having SN=4, and 404c having SN=5) to the receiver. However, during the time period depicted as an interruption 408, the receiver experiences an interruption during which it does not receive data transmitted by the sender. The interruption can be attributed to various causes. For example, the interruption can be due to fading of a wireless channel, due to monitoring of a channel other than a channel configured for receiving user data, such as monitoring of a paging channel (e.g., Paging Channel (PCH)). Accordingly, the receiver does not receive user data PDUs 404. In addition, the receiver does not receive data PDU 406 (having SN=6). In one aspect, PDU 406 includes a polling request (depicted as a set or asserted polling flag P), which indicates a request for status information. In response to such request, the receiver can transmit to the sender information indicating which PDUs were received and/or which PDUs were missing or lost (e.g., not received).

The sender can transmit the next data PDU 410 (having SN=7), which may also include a polling request. In response to receiving the polling request, the receiver can generate and transmit status information. In one aspect, status information 412 can include identification of received user data along with missing or lost user data. Status information may be transmitted as a status protocol data unit (STATUS PDU), as is further described in 3GPP TS 25.322: Radio Link Control (RLC) protocol specification (Release 7). In one aspect, STATUS PDU includes a Super-Field (SUFI) list comprising information about which data PDUs have been received and which have been detected as missing. As is illustrated, STATUS PDU 412 includes a NACK field (NACK SN=3, L=3) which indicates that PDUs 404a-404c and 406 preceding PDU 410 (e.g., PDUs with sequence numbers 3 through 6) were lost in transmission. STATUS PDU 412 also includes an ACK field (ACK LSN=8) indicating that PDU 410 (having SN=7) was received correctly. In one aspect, the NACK field includes information associated with a sequence number of the first lost PDU in a sequence of lost PDUs along with the number of corresponding to a count of consecutive PDUs that follow the first lost PDU. The ACK field includes information associated with the sequence number of last received PDU, such as last sequence number (LSN)+1 of the last received PDU.

Status information 412 informs the sender that PDUs 404a, 404b, 404c, and 406 were lost. In some aspects, the sender retransmits the lost PDUs as is depicted by 414 (414a, 414b, 414c, and 414d). In particular, when Acknowledged Mode (AM) transmission is utilized, the sender may maintain a retransmission buffer that includes PDUs that have not been acknowledged as received by the receiver. The sender may also use a sliding window protocol, which may ensure a reliable delivery of data. The sliding window protocol may be configured so that subsequent user data is not transmitted to the receiver until the sender receives a positive acknowledgment that preceding user data has been received successfully.

In some situations, utilizing polling to recover from data losses introduces a detrimental delay and overhead into the wireless communication network 100. For example, as is illustrated in FIG. 4, the receiver generates and transmits status information in response to receiving a polling request from the sender. This can cause an unnecessary delay in retransmission of lost data. In some situations, the sender may be transmitting a continuous stream of user data, such as user data associated with a voice call, and the delay corresponding to polling can result in degradation of voice call quality (e.g., introduction of long delays in the conversation, introduction of echo, etc.). In addition, it is to be appreciated that a polling request may not be included in the first (or second, third, etc.) PDU transmitted by the sender following the interruption 408. This can further increase the delay associated with retransmission of lost data.

In certain situations, interruptions, such as the interruption depicted by 408, can be periodic and repeating. For example, the receiver can monitor a plurality of channels, and some of the channels in the plurality may not be configured to transmit user data. Such channels may include a Paging Channel (PCH) configured to inform the wireless device of an incoming call, Broadcast Channel (BCH) configured to transmit cell-specific and network-specific information, Multicast Channel (MCH) configured to transmit multicast and broadcast information, Forward Access Channel (FACH) configured to transmit control information, etc. For instance, the wireless device may periodically monitor the PCH for incoming calls, such as approximately every 15 frames, which may correspond to monitoring approximately every 150 ms. Accordingly, the delay and overhead associated with utilizing polling to recover lost data can cause a severe degradation of call data rates.

In some aspects, the delay and overhead associated with polling can be reduced and/or eliminated by configuring the receiver to generate and transmit status information following resumption from the interruption. The receiver can be configured to generate and transmit status information immediately upon resuming from the interruption. In addition, the receiver can be configured to automatically generate and transmit status information independent of receiving a polling request from the sender. Status information can indentify at least last received user data prior to the interruption. In some aspects, status information further identifies lost data due to the interruption.

Figure 5:
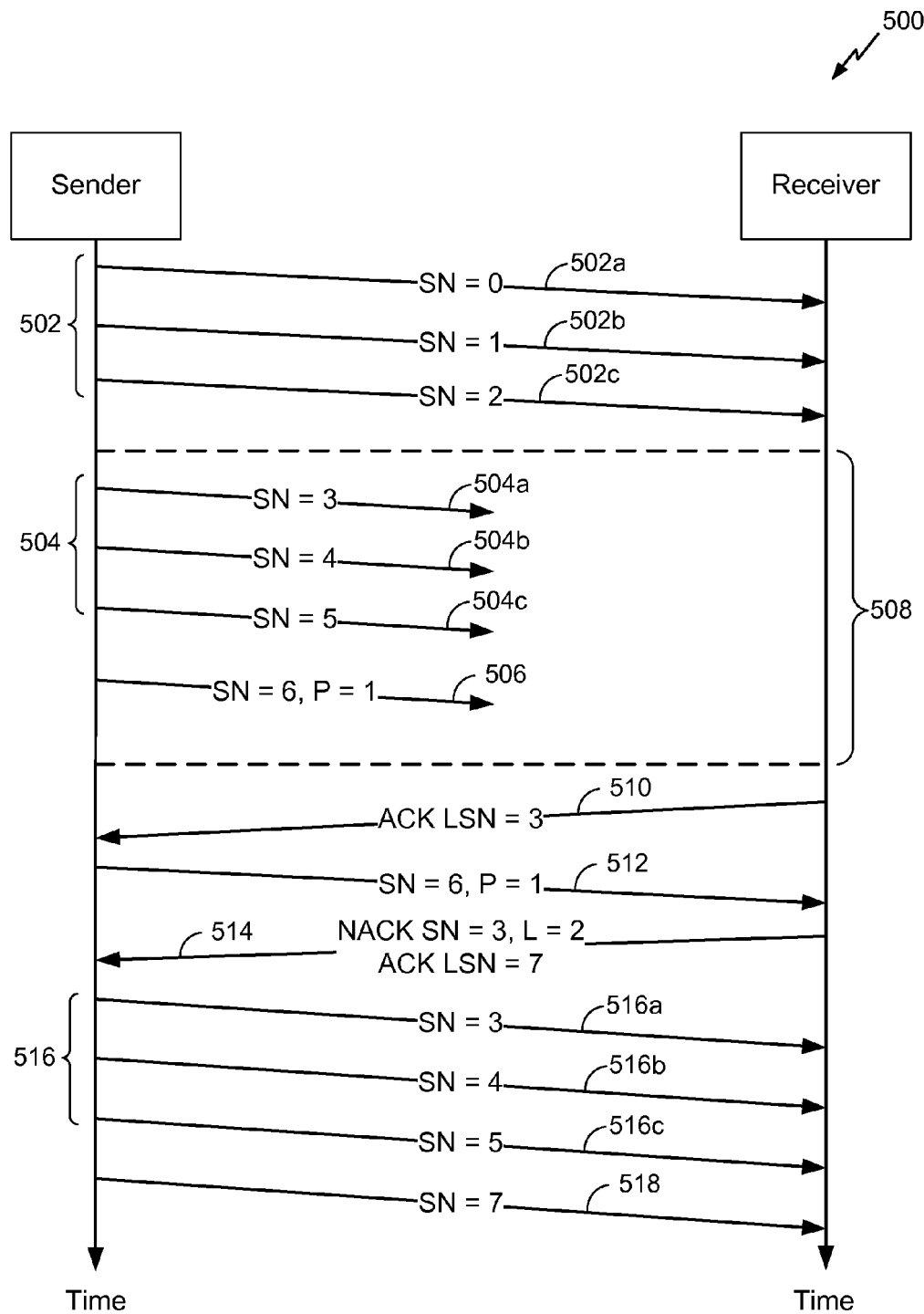
FIG. 5 illustrates an example of an improved recovery for the downlink that may be used within the wireless communication network of FIG. 1.

FIG. 5 illustrates an example of an improved recovery for the downlink 500 that may be used within the wireless communication network of FIG. 1. The sender transmits data PDUs 502 (e.g., 502a having SN=0, 502b having SN=1, and 502c having SN=2) to the receiver. This user data is received successfully. Next, the sender transmits data PDUs 504 (e.g., 504a having SN=3, 504b having SN=4, and 504c having SN=5) to the receiver. However, during the time period depicted as an interruption 508, the receiver experiences an interruption during which it does not receive data transmitted by the sender. As explained above, the interruption can be attributed to various causes. In addition, the receiver does not receive data PDU 506 (having SN=6). In one aspect, PDU 506 includes a polling request (depicted as a set or asserted polling flag P), which indicates a request for status information. It is to be appreciated that in other aspects PDU 506 may not include the polling request.

In some aspects, the sender generates and transmits status information upon resuming from the interruption 508. Status information 510 can include identification of user data received prior to the interruption 508. Status information may be transmitted as a STATUS PDU, as is explained above. STATUS PDU can include a SUFI list comprising information about which data PDUs have been received and which have been detected as missing. As is illustrated, STATUS PDU 510 includes a positive acknowledgment field (ACK LSN=3) indicating that the receiver successfully received data PDUs having sequence numbers 0 through 2. Upon receiving status information 510, the sender can determine that PDUs having sequence numbers 3 through 6 were lost and not received by the receiver. As a result, the sender can retransmit lost data.

As is depicted by PDU 512, the sender can initially retransmit PDU 506 (having SN=6). In one aspect, PDU 512 can include a polling request. In another aspect, PDU 512 can include user data having any sequence number (e.g., SN=10, 15, 20, etc.) and may not include a polling request. In response to receiving PDU 512, the receiver may generate and transmit status information, for example, in the form of a STATUS PDU 514. In one aspect, STATUS PDU 514 includes a Super-Field (SUFI) list comprising information about which data PDUs have been received and which are detected as missing. As is illustrated, STATUS PDU 514 includes a NACK field (NACK SN=3, L=2) which indicates that PDUs 504a-504c (e.g., PDUs with sequence numbers 3 through 5) were lost in transmission. STATUS PDU 514 also includes an ACK field (ACK LSN=7) indicating that PDU 512 (having SN=6) was received correctly. The sender can retransmit the lost PDUs 516 (516a, 516b, and 516c). When AM transmission with sliding window protocol is utilized, the sender may slide the transmission window forward and transmit PDU 518 (SN=7), which includes next batch of user data.

It should be appreciated that in some aspects the sender transmits lost data PDUs 504 immediately after receiving status information 510. In other words, the sender may transmit lost data PDUs 504 prior to or along with transmitting PDU 512. Lost data may be retransmitted in any order. In addition, as PDU 512 may not include a polling request, the receiver can be configured to generate and transmit status information independent of receiving a polling request.

Figure 6:
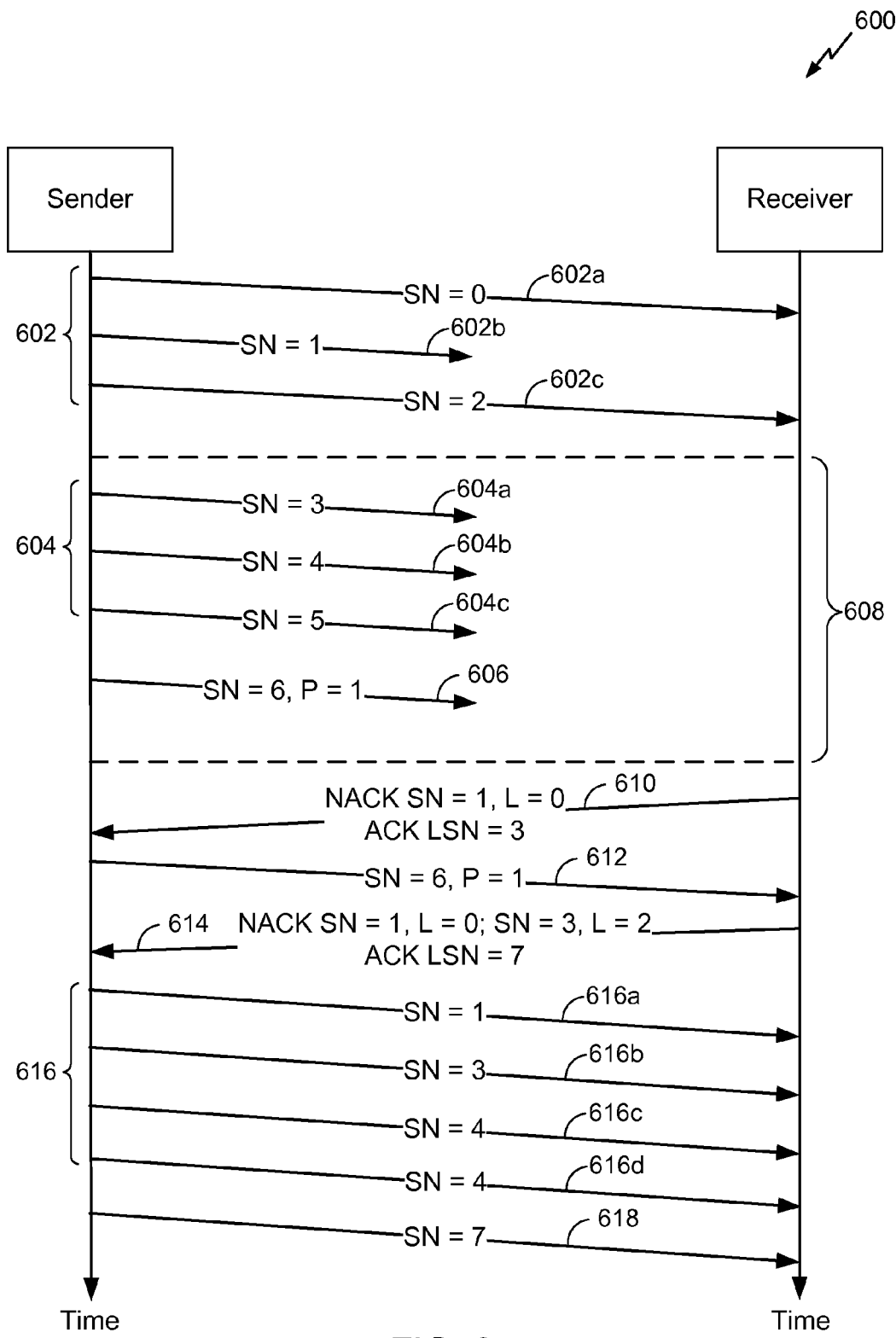
FIG. 6 illustrates another example of an improved recovery for the downlink that may be used within the wireless communication network of FIG. 1.

FIG. 6 illustrates another example of an improved recovery for the downlink 600 that may be used within the wireless communication network of FIG. 1. The sender transmits data PDUs 602 (e.g., 602a having SN=0, 602b having SN=1, and 602c having SN=2) to the receiver. While PDUs 602a and 602c are received successfully, PDU 602b is not received (e.g., dropped). Next, the sender transmits data PDUs 604 (e.g., 604a having SN=3, 604b having SN=4, and 604c having SN=5) to the receiver. However, during the time period depicted as an interruption 608, the receiver experiences an interruption during which it does not receive data transmitted by the sender. As explained above, the interruption can be attributed to various causes. In addition, the receiver does not receive data PDU 606 (having SN=6). In one aspect, PDU 606 includes a polling request (depicted as a set or asserted polling flag P), which indicates a request for status information. It is to be appreciated that in other aspects PDU 606 may not include the polling request.

In some aspects, the sender generates and transmits status information upon resuming from the interruption 608. Status information 610 can include identification of user data received prior to the interruption 608 along with missing or lost user data. Status information may be transmitted as a STATUS PDU, as is explained above. As is illustrated, STATUS PDU 610 includes a SUFI list comprising information about which data PDUs have been received and which are detected as missing. In particular, STATUS PDU 610 includes a negative acknowledgement field (NACK SN=1, L=0) which indicates that PDU 602b (e.g., PDUs with sequence number 1) was lost in transmission. STATUS PDU 610 also includes a positive acknowledgment field (ACK LSN=3) indicating that the receiver successfully received data PDUs 602a (SN=0) and 602c (SN=2). Upon receiving status information 610, the sender can determine that PDUs having sequence numbers 1 and 3-6 were lost and not received by the receiver. As a result, the sender can retransmit the lost PDUs.

As is depicted by PDU 612, the sender can initially retransmit PDU 606 (having SN=6). In one aspect, PDU 612 can include a polling request. In another aspect, PDU 612 can include user data having any sequence number (e.g., SN=10, 15, 20, etc.) and may not include a polling request. In response to receiving PDU 612, the receiver may generate and transmit status information, for example, in the form of a STATUS PDU 614. In one aspect, STATUS PDU 614 includes a Super-Field (SUFI) list comprising information about which data PDUs have been received and which are detected as missing. As is illustrated, STATUS PDU 614 includes a NACK field (NACK SN=1, L=0; SN=3, L=2) which indicates that PDUs 602b and 604a-604c (e.g., PDUs with sequence numbers 1 and 3-5) were lost in transmission. STATUS PDU 614 also includes an ACK field (ACK LSN=7) indicating that PDU 612 (having SN=6) was received correctly. The sender can retransmit the lost PDUs as is depicted by 616 (616a, 616b, 616c, and 616d). When AM transmission with sliding window protocol is utilized, the sender may slide the transmission window forward and transmit PDU 618 (SN=7), which includes next batch of user data.

It should be appreciated that in some aspects the sender transmits lost data PDU 602b and PDUs 604 immediately after receiving status information 610. In other words, the sender may transmit lost data PDU 602b and PDUs 604 prior to or along with transmitting PDU 612. Lost data may be retransmitted in any order. In addition, as PDU 612 may not include a polling request, the receiver can be configured to generate and transmit status information independent of receiving a polling request.

Figure 7:
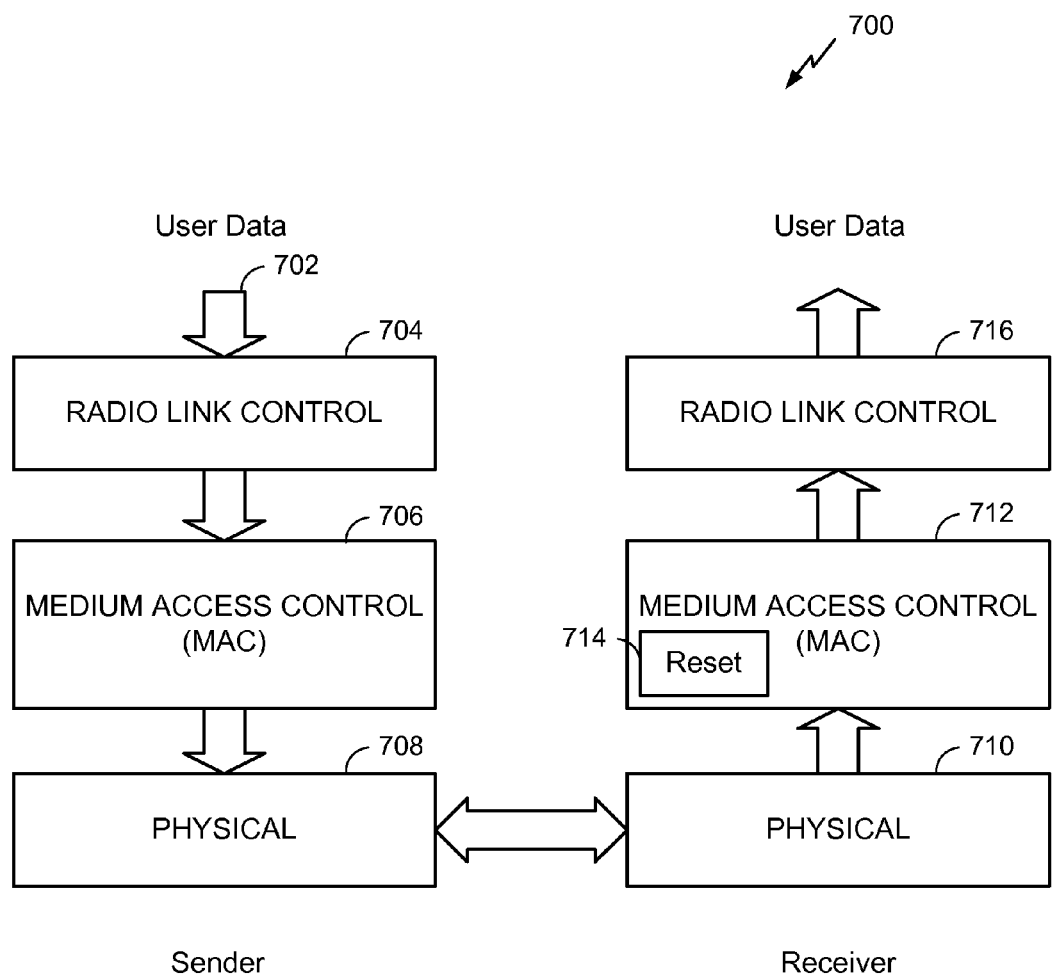
FIG. 7 illustrates an example of a protocol stack that may be employed within the wireless communication network of FIG. 1.

FIG. 7 illustrates an example of a protocol stack 700 that may be employed within the wireless communication network of FIG. 1. The protocol stack 700 can be implemented by the sender and receiver. In one aspect, the wireless device 302 can implement the receiver side of the protocol stack 700. The protocol stack 700 can be employed to facilitate peer-to-peer communication between the sender and receiver, for example, when UMTS radio communication is used. The layers depicted in the protocol stack 700 can provide services to upper layers including mapping between physical, transport, and logical channels, channel prioritization, priority handling and scheduling, etc. Upper layers can include Packet Data Convergence Protocol (PDCP) and Radio Resource Control (RRC), and so forth.

Radio Link Control (RLC) layer 704 of the sender can be configured to pass data, such as user data 702, over a logical channel interface from the upper layers to the Medium Access Control (MAC) layer 706. MAC layer 706 can be configured to format data and send it over a transport channel interface to the Physical layer 708, which can encode and transport data over a physical channel (e.g., air interface) to the counterpart Physical layer 710 of the receiver. Physical layer 710 can decode data and send it over a transport channel interface up to the MAC layer 712, which can pass data over a logical channel interface to the RLC layer 716. The RLC layer 716 can pass user data to the upper layers. Transport channels may include PCH, BCH, MCH, FACH, etc.

In one aspect, the MAC layer 712 includes a reset block 714 configured to reset the MAC layer. In some situations, such as during call handovers, received data can carry a MAC layer rest indicator to the receiver. This indicator can be generated by the wireless communication network 100, such as an RNC of AP 104. In some aspects, generation and transmission of status information is performed independent of a request to reset and a reset operation of the MAC layer 712.

Figure 8:
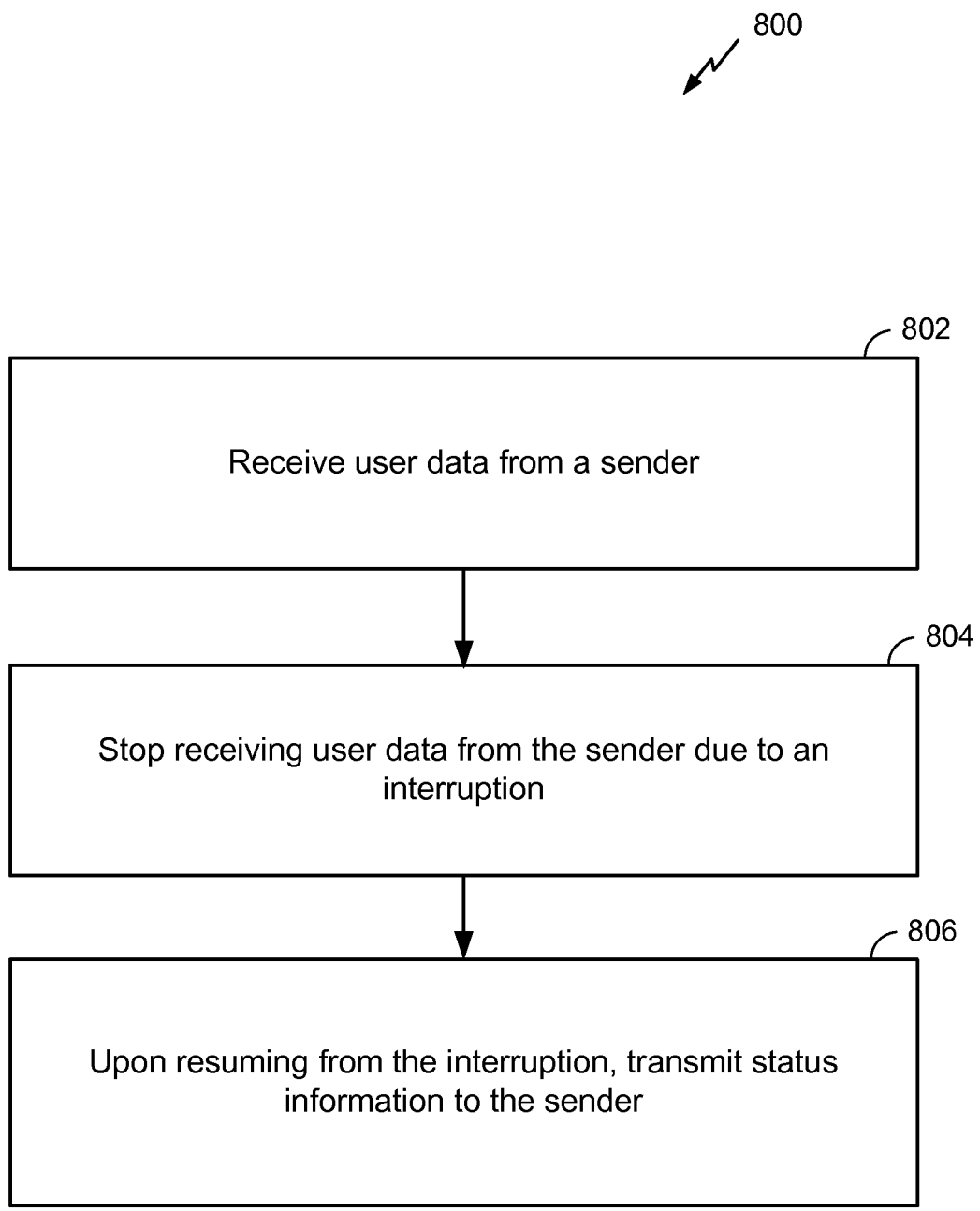
FIG. 8 illustrates an aspect of a method for an improved recovery for the downlink.

FIG. 8 illustrates an aspect of a method 800 for an improved recovery for the downlink. The method 800 may be used to generate and transmit status information as is illustrated in FIGS. 5 and 6. The method can be executed by elements of the wireless device 302. However, those having ordinary skill in the art will appreciate that other components may be used to implement one or more of the steps described herein.

At a block 802, user data is received from a sender. For example, a STA 106 receives user data from another STA 106 and/or AP 104. The reception may be performed by the receiver 312, for example. User data may be stored in memory 306 and processed by the processor 304. At a block 804, user data from the sender is not received due to an interruption. The interruption can be attributed to various causes including, for example, fading of a wireless channel, monitoring of a channel other than a channel configured for receiving user data, such as monitoring of a paging channel (e.g., PCH). The interruption may be detected, for example, by the processor 304, the DSP 320, and/or the signal detector 318.

At a block 806, the method resumes from the interruption and status information is transmitted to the sender. For example, status information can be generated by the processor 304 and transmitted by the transmitter 310. Status information can be transmitted immediately upon resuming from the interruption. In addition, status information can be automatically generated and transmitted independent of receiving a polling request from the sender. Status information can indentify at least last received user data prior to the interruption. In some aspects, status information further identifies lost data due to the interruption.

Figure 9:
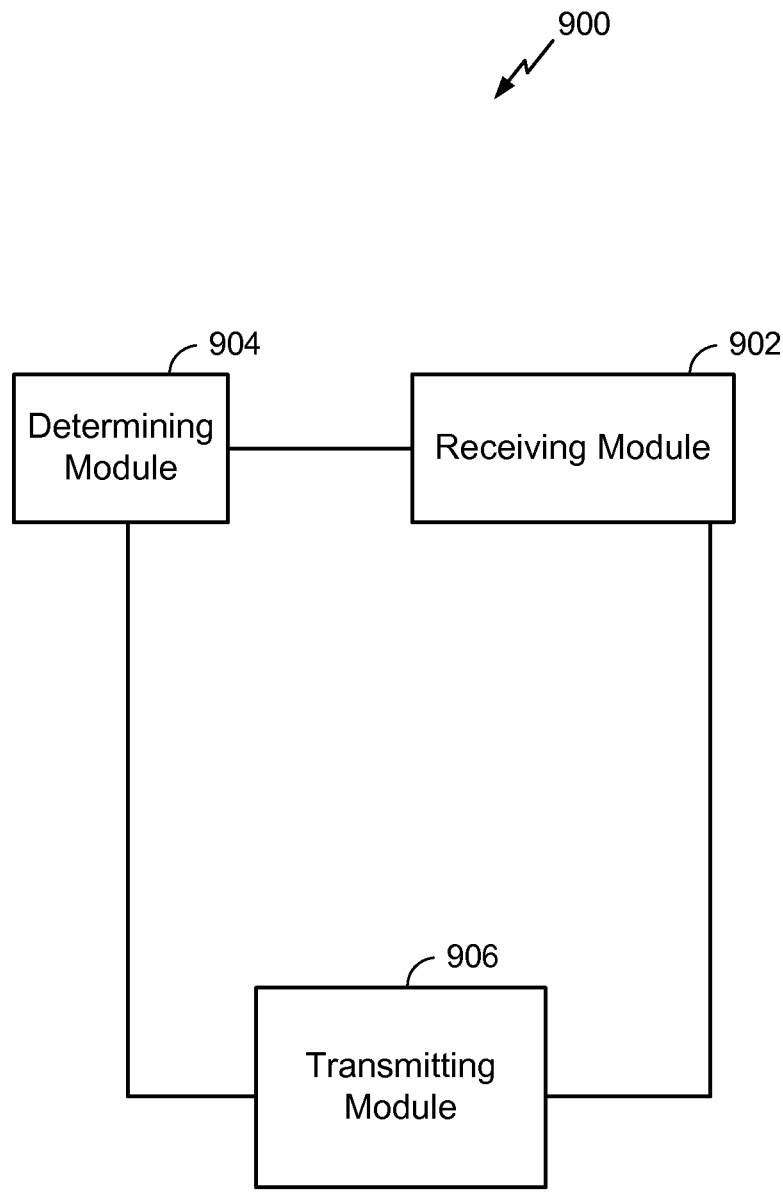
FIG. 9 is a functional block diagram of another exemplary wireless device that may be used within the wireless communication network of FIG. 1.

FIG. 9 is a functional block diagram of another exemplary wireless device 900 that may be used within the wireless communication network of FIG. 1. The wireless device 900, for example, can include a STA, a UE, an AT, a subscriber station, a subscriber unit, a mobile station, a remote station, a remote terminal, a user terminal, a user agent, a user device, etc. As another example, the wireless device 900 may be multimode or multiband device, capable of operating using different radio access technologies (RATs), such as using LTE, LTE Advanced, HSPA, CDMA, HRPD, eHRPD, CDMA2000, GSM, GPRS, EDGE, UMTS, or the like.

In some aspects, the wireless device 900 comprises a receiving module 902 for receiving user data from a sender. The receiving module 902 may be configured to perform one or more of the functions discussed above with respect to the block 802. The receiving module 902 may correspond to one or more of the receiver 312, the transceiver 314, the processor 304, the signal detector 318, and the DSP 320. In one aspect, receiving means may include the receiving module 902. The wireless device 900 further includes a determining module 904 for determining whether the receiving module 902 has ceased receiving user data due to an interruption. The determining module 904 may be configured to perform one or more of the functions discussed above with respect to the block 804. The determining module 904 may correspond to one or more of the receiver 312, the transceiver 314, the processor 304, the signal detector 318, and the DSP 320. In one aspect, determining means may include the determining module 904.

The wireless device 900 further comprises a transmitting module 906 for transmitting status information upon resuming from the interruption. In some aspects, the transmitting module 906 may be configured to perform one or more of the functions discussed above with respect to the block 806. The transmitting module 906 may correspond to one or more of the processor 304, the signal detector 317, the DSP 320, the transmitter 310, and the transceiver 314. In one aspect, transmitting means may include the transmitting module 906. Status information can be generated and transmitted immediately upon resuming from the interruption. In addition, status information can be automatically generated and transmitted independent of receiving a polling request from the sender. Status information can indentify at least last received user data prior to the interruption. In some aspects, status information further identifies lost data due to the interruption.

Figure 10:
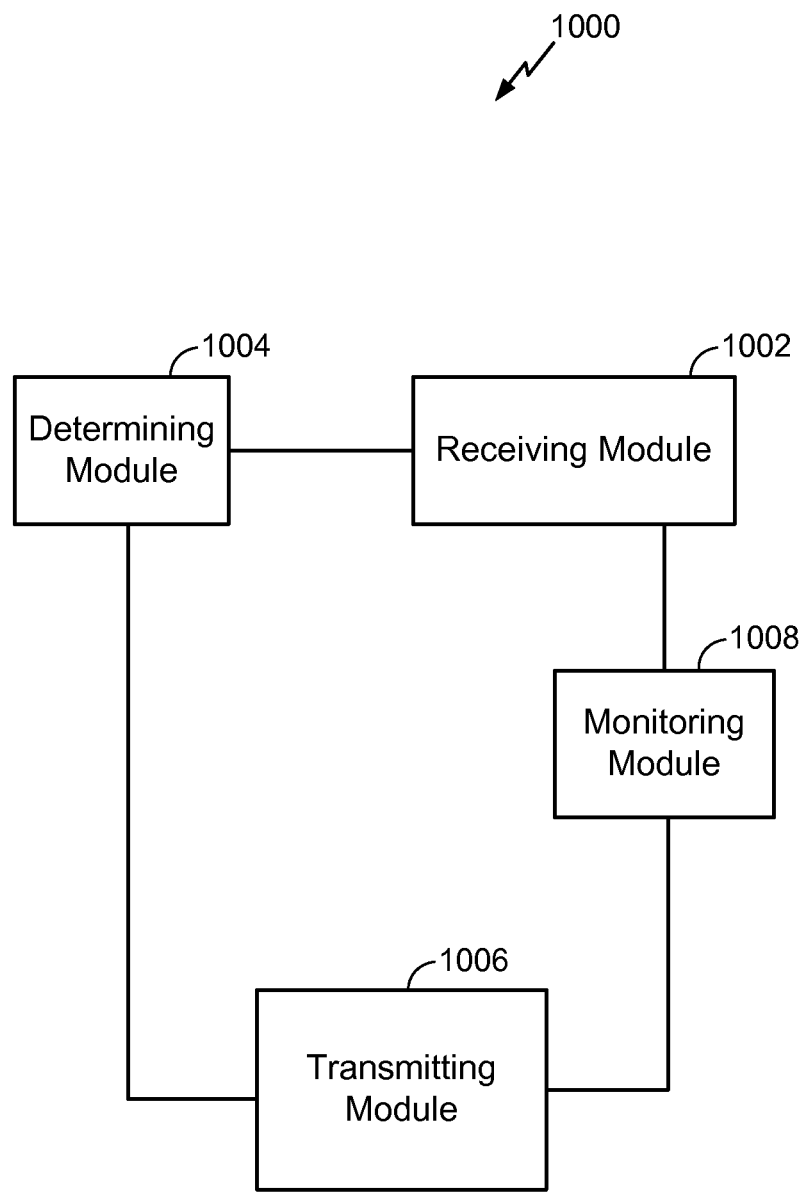
FIG. 10 is a functional block diagram of yet another exemplary wireless device that may be used within the wireless communication network of FIG. 1.

FIG. 10 is a functional block diagram of yet another exemplary wireless device 1000 that may be used within the wireless communication network of FIG. 1. The wireless device 1000, for example, can include a STA, a UE, an AT, a subscriber station, a subscriber unit, a mobile station, a remote station, a remote terminal, a user terminal, a user agent, a user device, etc. As another example, the wireless device 1000 may be multimode or multiband device, capable of operating using different radio access technologies (RATs), such as using LTE, LTE Advanced, HSPA, CDMA, HRPD, eHRPD, CDMA2000, GSM, GPRS, EDGE, UMTS, or the like.

In some aspects, the wireless device 1000 comprises a receiving module 1002 for receiving user data from a sender. The receiving module 1002 may be configured to perform one or more of the functions discussed above with respect to the block 802. The receiving module 1002 may correspond to one or more of the receiver 312, the transceiver 314, the processor 304, the signal detector 318, and the DSP 320. In one aspect, receiving means may include the receiving module 1002. The wireless device 1000 further includes a determining module 1004 for determining whether the receiving module 1002 has ceased receiving user data due to an interruption. The determining module 1004 may be configured to perform one or more of the functions discussed above with respect to the block 804. The determining module 1004 may correspond to one or more of the receiver 312, the transceiver 314, the processor 304, the signal detector 318, and the DSP 320. In one aspect, determining means may include the determining module 1004.

The wireless device 1000 further comprises a transmitting module 1006 for transmitting status information upon resuming from the interruption. In some aspects, the transmitting module 1006 may be configured to perform one or more of the functions discussed above with respect to the block 806. The transmitting module 1006 may correspond to one or more of the processor 304, the signal detector 317, the DSP 320, the transmitter 310, and the transceiver 314. In one aspect, transmitting means may include the transmitting module 1006. Status information can be generated and transmitted immediately upon resuming from the interruption. In addition, status information can be automatically generated and transmitted independent of receiving a polling request from the sender. Status information can indentify at least last received user data prior to the interruption. In some aspects, status information further identifies lost data due to the interruption.

In some aspects, the wireless device 1000 also includes monitoring module 1008 for monitoring a plurality of communication channels configured to transmit at least one of user data and control information. For example, the monitoring module 1008 can monitor a channel configured to transmit user data along with one or more channels configured to transmit control information, such as PCH, BCH, MCH, FACH, etc. The interruption can be due to the monitoring module 1008 monitoring a communication channel other than a channel configured to receive call data from the sender. For example, the monitoring module 1008 may periodically monitor a paging channel for incoming calls, such as monitor the PCH approximately every 15 frames, which may correspond to monitoring approximately every 150 ms. The monitoring module 1008 may correspond to one or more of the processor 304, the signal detector 317, the DSP 320, the transmitter 310, and the transceiver 314. In one aspect, monitoring means may include the monitoring module 1008.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for communicating in a wireless network, the apparatus comprising a processor configured to:
receive user data from a sender;
stop receiving user data from the sender due to an interruption; and
upon resuming from the interruption, transmit a status information to the sender identifying at least last received user data prior to the interruption and identifying lost user data due to the interruption, wherein the status information is transmitted independent of receiving a polling request from the sender, and wherein the status information comprises a status protocol data unit (PDU), the status PDU comprising a positive acknowledgment that comprises a value associated with a sequence number of a last received PDU and a negative acknowledgement that comprises a value associated with a sequence number of a first lost PDU and a count of consecutive PDUs that follow the first lost PDU.

2. The apparatus of claim 1, wherein the processor is further configured to receive the lost user data as a result of transmitting the status information to the sender.

3. The apparatus of claim 1, wherein the positive acknowledgment corresponds to the at least last received user data.

4. The apparatus of claim 3, wherein user data received from the sender comprises a plurality of PDUs.

5. The apparatus of claim 3, wherein the negative acknowledgment corresponds to the lost user data.

6. The apparatus of claim 5, wherein user data received from the sender comprises a plurality of PDUs.

7. The apparatus of claim 6, wherein each PDU of the plurality of PDUs comprises a unique sequence number.

8. The apparatus of claim 1, wherein the processor is further configured to:
receive user data using a medium access control (MAC) layer; and
transmit the status information independent of a reset of the MAC layer.

9. The apparatus of claim 1, wherein the processor is further configured to transmit the status information immediately upon resuming from the interruption.

10. The apparatus of claim 1, wherein the processor is further configured to monitor a plurality of communication channels configured to transmit at least one of user data and control information and the interruption is due to the processor monitoring a communication channel other than a channel configured to receive user data from the sender.

11. The apparatus of claim 1, wherein the processor is further configured to monitor a plurality of communication channels configured to transmit at least one of user data and status information and the interruption is due to the processor monitoring a paging channel configured to notify the apparatus of an incoming call.

12. The apparatus of claim 11, wherein the interruption is periodic.

13. The apparatus of claim 1, wherein the processor is further configured to receive user data from the sender over at least one of: a GSM wireless network, an EDGE wireless network, a UMTS wireless network, an LTE wireless network, and an LTE Advanced wireless network.

14. A method of communicating in a wireless network, the method comprising:
receiving user data from a sender;
suspending receiving user data from the sender due to an interruption; and upon resuming from the interruption, transmitting a status information to the sender identifying at least last received user data prior to the interruption and identifying lost user data due to the interruption, wherein the status information is transmitted independent of receiving a polling request from the sender, and wherein the status information comprises a status protocol data unit (PDU), the status PDU comprising a positive acknowledgment that comprises a value associated with a sequence number of a last received PDU and a negative acknowledgement that comprises a value associated with a sequence number of a first lost PDU and a count of consecutive PDUs that follow the first lost PDU.

15. The method of claim 14, further comprising receiving the lost user data as a result of transmitting the status information to the sender.

16. The method of claim 14, wherein the positive acknowledgment corresponds to the at least last received user data.

17. The method of claim 16, wherein user data received from the sender comprises a plurality of PDUs.

18. The method of claim 16, wherein the negative acknowledgment corresponds to the lost user data.

19. The method of claim 18, wherein user data received from the sender comprises a plurality of PDUs.

20. The method of claim 19, wherein each PDU of the plurality of PDUs comprises a unique sequence number.

21. The method of claim 14, further comprising:
receiving user data using a medium access control (MAC) layer; and
transmitting the status information independent of a reset of the MAC layer.

22. The method of claim 14, further comprising transmitting the status information immediately upon resuming from the interruption.

23. The method of claim 14, wherein the interruption is due to monitoring of a communication channel other than a channel configured to receive call data from the sender.

24. The method of claim 14, wherein the interruption is due to monitoring of a paging channel configured to notify of an incoming call.

25. The method of claim 14, further comprising receiving user data from the sender over at least one of: a GSM wireless network, an EDGE wireless network, a UMTS wireless network, an LTE wireless network, and an LTE Advanced wireless network.

26. A non-transitory computer readable medium comprising instructions that when executed cause an apparatus to:
wirelessly receive user data from a sender;
stop receiving user data from the sender due to an interruption; and
upon resuming from the interruption, wirelessly transmit a status information to the sender identifying at least last received user data prior to the interruption and identifying lost user data due to the interruption, wherein the status information is transmitted independent of receiving a polling request from the sender, and wherein the status information comprises a status protocol data unit (PDU), the status PDU comprising a positive acknowledgment that comprises a value associated with a sequence number of a last received PDU and a negative acknowledgement that comprises a value associated with a sequence number of a first lost PDU and a count of consecutive PDUs that follow the first lost PDU.

27. The computer readable medium of claim 26, further comprising instructions that when executed cause the apparatus to receive the lost user data as a result of transmitting the status information to the sender.

28. The computer readable medium of claim 26, wherein the positive acknowledgment corresponds to the at least last received user data.

29. The computer readable medium of claim 28, wherein user data received from the sender comprises a plurality of PDUs.

30. The computer readable medium of claim 28, wherein the negative acknowledgment corresponds to the lost user data.

31. The computer readable medium of claim 30, wherein user data received from the sender comprises a plurality of PDUs.

32. The computer readable medium of claim 31, wherein each PDU of the plurality of PDUs comprises a unique sequence number.

33. The computer readable medium of claim 26, further comprising instructions that when executed cause the apparatus to:
receive user data using a medium access control (MAC) layer; and
transmit the status information independent of a reset of the MAC layer.

34. The computer readable medium of claim 26, further comprising instructions that when executed cause the apparatus to transmit the status information immediately upon resuming from the interruption.

35. The computer readable medium of claim 26, further comprising instructions that when executed cause the apparatus to monitor a plurality of communication channels configured to transmit at least one of user data and control information and the interruption is due to the apparatus monitoring a communication channel other than a channel configured to receive call data from the sender.

36. The computer readable medium of claim 26, further comprising instructions that when executed cause the apparatus to monitor a plurality of communication channels configured to transmit at least one of user data and control information and the interruption is due to the apparatus monitoring a paging channel configured to notify the apparatus of an incoming call.

37. The computer readable medium of claim 26, further comprising instructions that when executed cause the apparatus to receive user data from the sender over at least one of: a GSM wireless network, an EDGE wireless network, a UMTS wireless network, an LTE wireless network, and an LTE Advanced wireless network.

38. An apparatus for communicating in a wireless network, the apparatus comprising:
means for receiving user data from a sender;
means for determining whether the receiving means has ceased receiving user data from the sender due to an interruption; and
means for transmitting upon resuming from the interruption a status information to the sender identifying at least last received user data prior to the interruption and identifying lost user data due to the interruption, wherein the status information is transmitted independent of receiving a polling request from the sender, and wherein the status information comprises a status protocol data unit (PDU), the status PDU comprising a positive acknowledgment that comprises a value associated with a sequence number of a last received PDU and a negative acknowledgement that comprises a value associated with a sequence number of a first lost PDU and a count of consecutive PDUs that follow the first lost PDU.

39. The apparatus of claim 38, wherein the means for receiving is configured to receive the lost user data as a result of the transmitting means transmitting the status information to the sender.

40. The apparatus of claim 38, wherein the positive acknowledgment corresponds to the at least last received user data.

41. The apparatus of claim 40, wherein user data received from the sender comprises a plurality of PDUs.

42. The apparatus of claim 40, wherein the negative acknowledgment corresponds to the lost user data.

43. The apparatus of claim 42, wherein user data received from the sender comprises a plurality of PDUs.

44. The apparatus of claim 43, wherein each PDU of the plurality of PDUs comprises a unique sequence number.

45. The apparatus of claim 38, wherein:
the means for receiving is configured to receive user data using a medium access control (MAC) layer; and
the means for transmitting is configured to transmit the status information independent of a reset of the MAC layer.

46. The apparatus of claim 38, wherein the means for transmitting is configured to transmit the status information immediately upon resuming from the interruption.

47. The apparatus of claim 38, further comprising means for monitoring a plurality of communication channels configured to transmit at least one of user data and control information, and the interruption is due to the monitoring means monitoring a communication channel other than a channel configured to receive call data from the sender.

48. The apparatus of claim 38, further comprising means for monitoring a plurality of communication channels configured to transmit at least one of user data and control information, and the interruption is due to the monitoring means monitoring a paging channel configured to notify the apparatus of an incoming call.

49. The apparatus of claim 38, wherein the receiving means is configured to receive user data from the sender over at least one of: a GSM wireless network, an EDGE wireless network, a UMTS wireless network, an LTE wireless network, and an LTE Advanced wireless network.

* * * * *